US011414118B2

(12) United States Patent
Bengtson et al.

(10) Patent No.: US 11,414,118 B2
(45) Date of Patent: Aug. 16, 2022

(54) HOLDER AND SYSTEM FOR MOUNTING AND SUPPORTING A SMART DEVICE ON A SHOPPING CART

(71) Applicant: The Kroger Co., Cincinnati, OH (US)

(72) Inventors: Annesleigh H. Bengtson, Greensboro, NC (US); Brad D. Jewell, Loveland, OH (US)

(73) Assignee: THE KROGER CO., Cincinnati, OH (US)

(*) Notice: Subject to any disclaimer, the term of this patent is extended or adjusted under 35 U.S.C. 154(b) by 91 days.

(21) Appl. No.: 16/705,773

(22) Filed: Dec. 6, 2019

(65) Prior Publication Data

US 2021/0171081 A1 Jun. 10, 2021

(51) Int. Cl.
*H04B 1/3888* (2015.01)
*B62B 3/14* (2006.01)

(52) U.S. Cl.
CPC ......... *B62B 3/1472* (2013.01); *H04B 1/3888* (2013.01)

(58) Field of Classification Search
CPC ... B62B 3/1472; B62B 3/1416; B62B 3/1428; H04B 1/3888
See application file for complete search history.

(56) References Cited

U.S. PATENT DOCUMENTS

| | | | |
|---|---|---|---|
| 6,481,684 B1 * | 11/2002 | Farmer | B60R 11/0241 248/225.11 |
| 8,672,199 B1 | 3/2014 | Ditore et al. | |
| 9,475,515 B2 | 10/2016 | Carruthers et al. | |
| 10,906,574 B1 * | 2/2021 | Neal | B62B 3/1428 |
| 2003/0162510 A1 * | 8/2003 | Kim | A45F 5/02 455/575.1 |
| 2008/0128571 A1 * | 6/2008 | Dostaler | B62B 3/1428 248/231.51 |

(Continued)

FOREIGN PATENT DOCUMENTS

| CN | 107528953 A | * 12/2017 | ............. A45C 11/00 |
|---|---|---|---|
| CN | 113067919 A | * 7/2021 | |

(Continued)

OTHER PUBLICATIONS https://www.dream-baby.com/ezy-fit-phone-holder.html.
https://www.amazon.com/Shopping-Cart-Phone-Holder-Secure/dp/B01GPPUYWC?th=1.

*Primary Examiner* — James A Shriver, II
*Assistant Examiner* — Michael T. Walsh
(74) *Attorney, Agent, or Firm* — Stites & Harbison, PLLC; Terry L. Wright; Gary N. Stewart

(57) ABSTRACT

A holder for mounting to a shopping cart and supporting a smart device includes a receptacle for receiving a smart device and at least one fastener for securing the receptacle to a handle of the shopping cart. The receptacle includes a planar surface having a front face, a back face, and a sidewall that extends perpendicularly away from the front face and along each side and bottom of the planar surface. The planar surface also defines a channel for receiving an accessory associated with a smart device. The length and width of the receptacle are sized to permit the upper portion of a smart device to extend out of the receptacle and to configure the manner in which the smart device is received by the receptacle. The holder can be installed on a shopping cart to provide system for holding a smart device.

18 Claims, 5 Drawing Sheets

(56) References Cited

U.S. PATENT DOCUMENTS

| | | | | |
|---|---|---|---|---|
| 2009/0140113 A1* | 6/2009 | Carnevali | ............... | F16M 13/00 |
| | | | | 248/223.41 |
| 2010/0264182 A1* | 10/2010 | Perlman | ................. | H04M 1/04 |
| | | | | 224/409 |
| 2012/0161406 A1* | 6/2012 | Mersky | ................. | F16M 13/02 |
| | | | | 280/33.992 |
| 2013/0214019 A1* | 8/2013 | Wu | ......................... | B62J 11/00 |
| | | | | 224/413 |
| 2014/0091192 A1* | 4/2014 | Mersky | ................. | A47B 23/02 |
| | | | | 248/447 |
| 2015/0371320 A1* | 12/2015 | Argue | .................... | B62B 3/142 |
| | | | | 705/26.8 |
| 2016/0185375 A1* | 6/2016 | Yu | ........................... | B62B 3/146 |
| | | | | 224/411 |
| 2016/0241289 A1* | 8/2016 | Wieth | .................. | B62B 3/1428 |
| 2017/0005686 A1* | 1/2017 | Borisen | ................ | H04B 1/3888 |
| 2018/0069580 A1* | 3/2018 | Harris-Johnson | ...... | H04B 1/385 |
| 2018/0187829 A1* | 7/2018 | Bacallao | ................ | B62B 3/1428 |
| 2019/0126965 A1* | 5/2019 | Bacallao | ................ | B62B 3/1428 |
| 2020/0317285 A1* | 10/2020 | Rettick | .................. | H04M 1/04 |

FOREIGN PATENT DOCUMENTS

| | | | | |
|---|---|---|---|---|
| DE | 202014004123 U1 * | 6/2015 | ........... | B62B 3/1428 |
| DE | 202017103740 U1 * | 10/2017 | ............. | H04M 1/04 |
| JP | 2000253122 A * | 9/2000 | | |
| KR | 20130002709 A * | 1/2013 | | |
| KR | 20130002709 A | 1/2013 | | |
| KR | 20130002709 A * | 8/2013 | | |
| WO | 2014/144880 A2 | 9/2014 | | |
| WO | WO-2014144880 A2 * | 9/2014 | ............... | A47C 4/00 |

\* cited by examiner

HOLDER AND SYSTEM FOR MOUNTING AND SUPPORTING A SMART DEVICE ON A SHOPPING CART

TECHNICAL FIELD

The present invention relates to a holder and system for mounting and supporting a smart device on a shopping cart. In particular, the present invention relates to a smart device holder configured to be mounted to a shopping cart to provide hands-free access to a user's smart device while shopping.

BACKGROUND

Holders that support smart devices, such as smart phones or tablets, in a fixed position without user intervention have become increasingly popular and relied upon by individuals as a means to access digital content while simultaneously carrying out day-to-day tasks. As a result, a variety of hands-free smart device holders is now commercially available.

To provide hands-free access to a user's smart device while shopping, some smart device holders are specifically designed to be secured to the handle of a shopping cart. Most commonly, however, these holders are not designed to be an enduring fixture associated with a shopping cart for use by a wide variety of individuals. Rather, such holders are generally intended for individual use and are designed to be easily attached and detached from a shopping cart so that users can take the holder with them for subsequent use once the users are finished shopping. Accordingly, because these smart device holders can be easily removed and stolen with little effort, they are not suitable as an enduring shopping cart fixture for use by the general public.

Furthermore, known smart device holders which are specifically designed to remain with a shopping cart also present disadvantages. Such disadvantages include: the inability to separate the holder from the shopping cart once secured thereto without breaking either the holder or the shopping cart; the inability to accommodate smart devices of variable length; the inability to accommodate accessories projecting outwardly from a face of a smart device; and the use of sliding or articulating members, which degrade and break after prolonged repetitive use, in order to accommodate a variety of smart devices or smart device orientations within the holder.

SUMMARY

The present disclosure relates to a smart device holder configured to be mounted to a shopping cart to provide hands-free access to a user's smart device while shopping. The holder can be installed on a shopping cart to provide a system for holding a smart device that can be utilized by shoppers in a commercial retail setting.

In one exemplary embodiment, a holder for mounting to a shopping cart and supporting a smart device comprises a receptacle including a planar surface having a front face, a back face, and a sidewall that extends perpendicularly away from the front face of the planar surface and along each side and bottom of the planar surface. The planar surface also defines a channel extending from an open top portion of the planar surface to a closed bottom portion of the planar surface. The holder further includes at least one fastener connected to the receptacle for securing the holder to a shopping cart.

To accommodate smart devices of varying length and to permit use of the camera on a user's device, in some embodiments, the receptacle includes an open top end such that the upper portion of smart devices having a length greater than that of the receptacle can extend beyond the receptacle. To avoid obstructing the field of view of the camera of the user's smart device, the receptacle, in some embodiments, thus has a length that is less than the length of a particular smart device or set of smart devices. In some embodiments, the channel defined by the planar surface is configured to permit passage of an accessory projecting from a face of a smart device. In some embodiments, the receptacle further includes a recessed portion that extends from the back face of the planar surface and across the channel to partially enclose the channel. To reduce the space on the handle of a shopping cart occupied by the holder and a smart device supported thereby, the sidewall of the receptacle may, in certain embodiments, define two opposing sidewall portions where the distance between those portions of the sidewall and, in turn, the width of the receptacle is less than a length of the smart deice. In such embodiments, the opposing sidewall portions thus prevent insertion of a smart device into the receptacle while in a horizontal or landscape orientation. In some embodiments, to prevent liquid buildup within the receptacle, the sidewall extending along the bottom portion of the planar surface includes one or more slots to allow liquid to drain from the receptacle.

Turning now to the at least one fastener included in a holder of the present invention, in one embodiment, the holder include two fasteners that are disposed on opposite sides of the channel. Each fastener includes an open end and a continuous central portion such that the fastener is configured to be positioned around the handle of a shopping cart. To provide a close-fitting connection between the fasteners and the handle of a shopping cart, each fastener includes a central portion that is generally shaped to correspond to an arc of the shopping cart handle's circumference. When the receptacle is connected to the fasteners, the open end of each fastener is then covered by the receptacle. Thus, when the holder is assembled around the handle of a shopping cart, the combination of the receptacle and fasteners surround and cover the exterior surface of the shopping cart handle in the areas of the handle where the fasteners are located. As such, once installed, the holder cannot be removed from the shopping cart without first disconnecting the receptacle from the fasteners. In such embodiments, the holder further includes a plurality of screws or similar means that are configured to removably secure the receptacle to the fasteners. In some embodiments, a tool must thus be used to engage the screws and the like in order to connect and disconnect the receptacle to the fasteners.

In other embodiments, the holder includes a clip-style fastener that is configured to clip to the handle of a shopping cart and allow for the attachment and removal of the holder from the handle of the shopping cart without the use of tools. The clip-style fastener may include two opposing arms extending outwardly from a base, with each arm configured to wrap around the handle of a shopping cart. In this way, the opposing arms of the fastener are further spaced apart to provide an open end opposite of the base through which the handle of the shopping cart passes when the holder is attached.

Further features and advantages of the present invention will become evident to those of ordinary skill in the art after a study of the description, figures, and non-limiting examples in this document.

DESCRIPTION OF EXEMPLARY EMBODIMENTS

The present invention relates to a smart device holder configured to be mounted to a shopping cart and provide hands-free access to a user's smart device while shopping. The holder can be installed on a shopping cart to provide a system for holding a smart device that can be utilized by shoppers in a commercial retail setting.

Figure 1A:
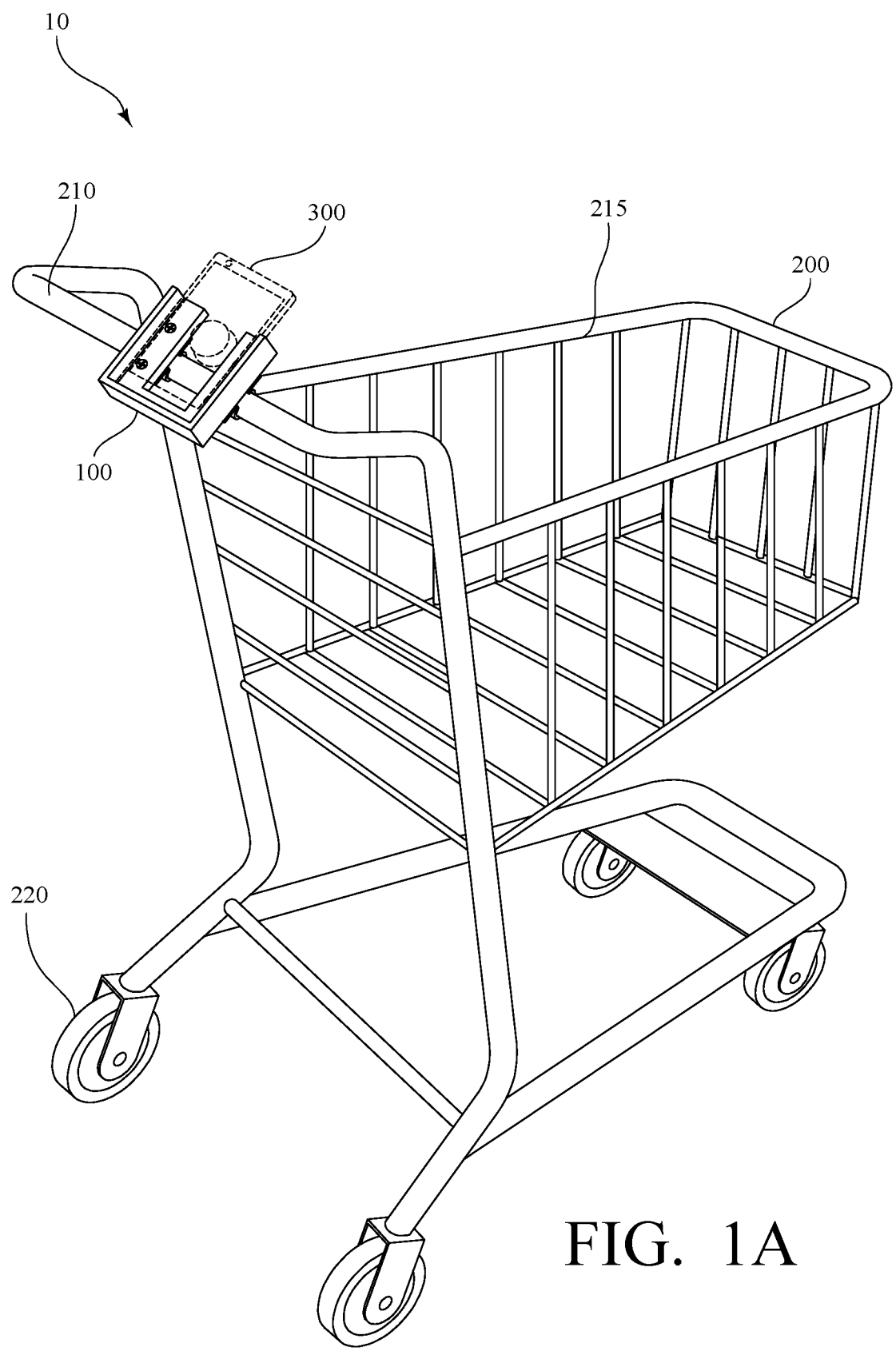
FIG. 1A is a perspective view of an exemplary system for holding a smart device in accordance with the present invention, which includes an exemplary holder made in accordance with one embodiment of the present invention.
Figure 1B:
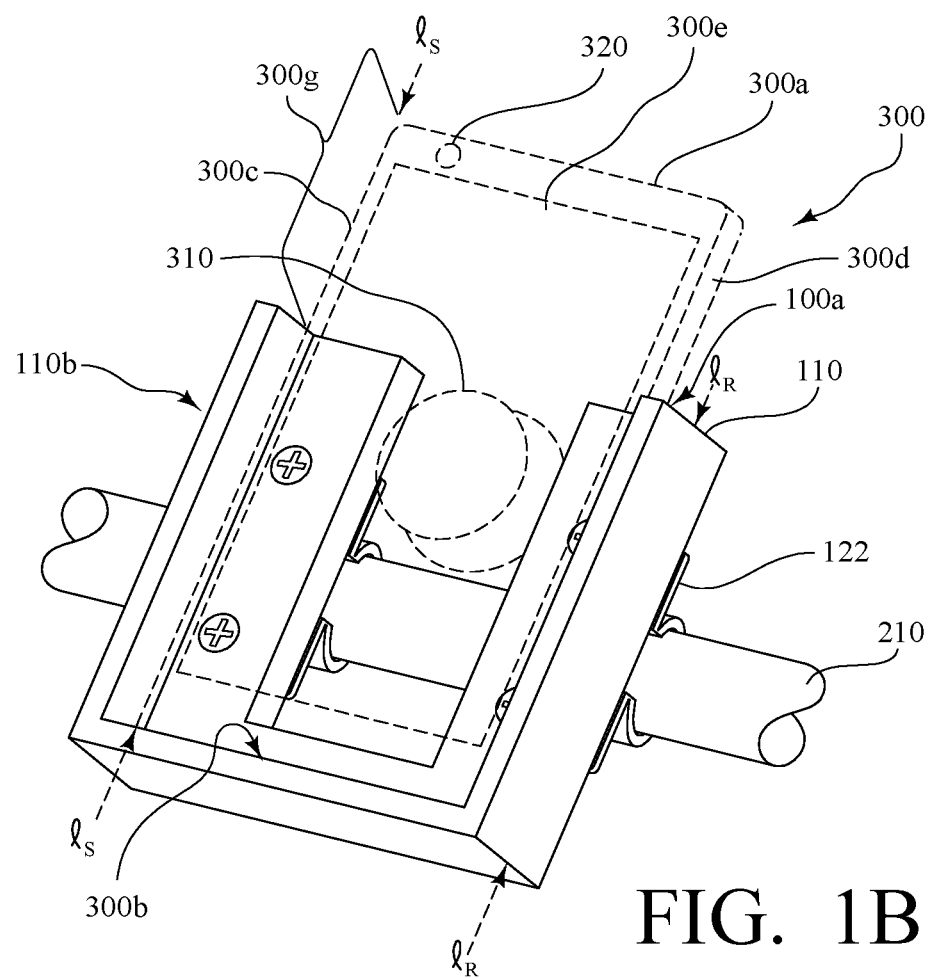
FIG. 1B is an enlarged partial perspective view of the system of FIG. 1A.
Figure 1C:
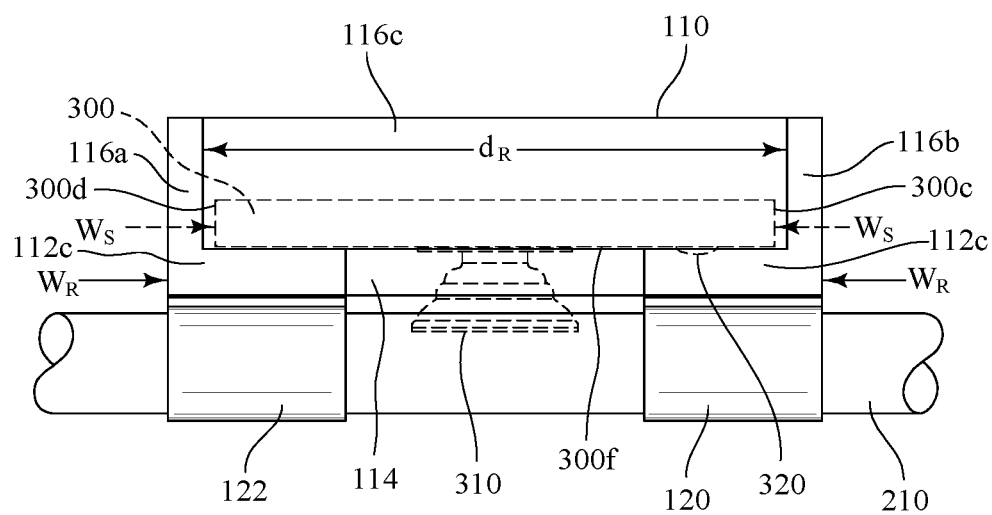
FIG. 1C is an enlarged partial top view of the system of FIG. 1A.

Referring first to FIGS. 1A-1C, in one exemplary system 10 for holding a smart device in accordance with the present invention, the system 10 includes a smart device holder 100 for supporting a smart device 300 on a shopping cart 200. The holder 100 is configured to support a user's smart device 300 in relation to the shopping cart 200 in a manner that enables the user to readily access their smart device 300 and view content displayed on the smart device 300 while shopping and without having to carry the smart device 300 in the user's hands. To this end, the holder 100 is configured to be secured to the handle 210 of the shopping cart 200 so that a user may access and view their smart device 300 while in close proximity to the shopping cart 200. As shown in FIGS. 1A-1C, the smart device 300 is generally oriented in a vertical or portrait orientation with a portion of the smart device extending beyond the holder 100 so as to not obstruct the field of view of the camera of the smart device 200, as described in further detail below.

Referring now to FIGS. 1A-1C and FIG. 2, the holder 100 includes a receptacle 110 for receiving the smart device 300 and at least one fastener for securing the holder 100 to the handle 210 of the shopping cart 200. In this exemplary embodiment, the holder 100 includes two fasteners: a first fastener 120 and a second fastener 122, which are both configured to receive a portion of the handle 210 of the shopping cart 200.

To support a smart device 300 while still providing access to the device's screen, the receptacle 110 is generally configured to receive and support the smart device 300 placed in the receptacle 110. Specifically, in this exemplary embodiment, the receptacle 110 is configured to fully support the bottom 300b of the smart device 300 and partially support the left side 300c, right side 300d, and back face 300f of the smart device 300, as perhaps best shown in FIGS. 1A-1C. To this end, the receptacle 110 includes a planar surface 112 and a sidewall 116. The planar surface 112 includes a front face 112a, a back face 112b, a top portion 112c, a bottom portion 112d, a left side 112e, and a right side 112f. The sidewall 116 extends perpendicularly away from the front face 112a and along the right side 112f, left side 112e, and bottom 112d of the planar surface 112 to define a first sidewall portion 116a, a second sidewall portion 116b, and a third sidewall portion 116c, respectively. When the holder 100 is upright, the third sidewall portion 116c thus defines a shelf on which a smart device 300, rests, while the first sidewall portion 116a and the second sidewall portions 116b define two opposing vertical barriers which restrict horizontal movement of the smart device 300 within the receptacle 110. As a result of the above-described arrangement of the planar surface 112 and sidewall 116, both the top end 110a and front face 110b of the receptacle 110 are left open, thereby providing two separate means of entry for positioning a smart device 300 onto the receptacle 110. Of course, it is contemplated that, in some embodiments, the open front face of the receptacle of an exemplary holder can also include an additional surface extending fully or partially across the open front face to provide a means to securely position a smart device in the holder.

The open top end 110a of the receptacle 110 also enables the receptacle 110 to accommodate smart devices 300 of different lengths. As perhaps shown best in FIG. 1B, the open top end 110a of the receptacle 110 permits the upper portion 300g of the smart device 300, which has a length (i.e., a distance between the top 300a and bottom 300b of the smart device 300 while in a vertical portrait orientation) $l_S$, greater than a length, $l_R$, of the receptacle 110, to extend out of the receptacle 110. As the camera 320 of many currently available smart devices 300 is generally located in proximity to the top 300a of the smart device 300, the open top end 110a of the receptacle 110 thus avoids any obstruction of the camera's 320 field of view while the smart device 300 is located within the receptacle 110. Accordingly, the open top end 110a of the receptacle 110 also serves to enable a user to access and use the camera 320 of the smart device 300 while the smart device 300 is located within the receptacle 110. In this way, not only is the receptacle 110 configured to allow a user to view the front display of the smart device 300 while shopping and thereby view various applications (i.e., "Apps"), advertisements, coupons, and the like, but the user additionally has access to the camera 320 for capturing images of various products, including images of Universal Product Codes (UPC), to obtain additional information about a particular product.

To permit insertion of a smart device 300 into the receptacle 110, the width, $w_R$, of the receptacle 110 is greater than the width, $w_S$, of the smart device 300. In other words, the distance, $d_R$, between the first sidewall portion 116a and the second sidewall portion 116b of the receptacle 100 is generally greater than the distance between the left side 300c and the right side 300d of the smart device 300 while in a vertical portrait orientation. However, to reduce the amount of space occupied on the handle 210 of the shopping cart 200 by the holder 100 and to suitably secure the smart device 300 in the holder 100, the holder 100 is configured to hold a smart device 300 in a vertical portrait orientation relative to the handle 210 of the shopping cart 200. In this regard, and as perhaps shown best in FIGS. 1A and 1B, the width, $w_R$, of the receptacle 110 is less than the length, $l_S$, of the smart device 300 to thereby prevent insertion of a smart device 300 into the receptacle 110 while the smart device 300 is in a horizontal or landscape orientation.

To further accommodate various features of the smart device 300, the planar surface 112 of the receptacle 110 also defines a channel 114 that extends from the top portion 112c of the planar surface 112 towards the bottom portion 112d of the planar surface 112, such that the planar surface 112 includes a top portion 112c that is open and a bottom portion 112d that is closed. As shown best in FIGS. 1A and 1B, in this exemplary embodiment, the channel 114 extends more than half of a length of the planar surface 112. The channel 114 also extends from the front face 112*a* to the back face 112*b* of the planar surface 112 to provide an opening within the planar surface 112 through which objects may pass. As shown in FIGS. 1A-1C, in this exemplary embodiment, the channel 114 is configured to permit an accessory 310 projecting from the back face 300*f* of a smart device 300 to pass through the planar surface 112. To this end, the width of the channel 114 is greater than the width of the accessory 310 of the smart device 300, but is less than the width, $w_S$, of the smart device 300, which permits the back face 300*f* of the smart device 300 to rest flush with the front face 112*a* of the planar surface 112 without the smart device 300 falling through the channel 114. In this way, the channel 114 permits users to utilize the system 10 and holder 100 without first having to remove accessories present on their smart device 300. In FIGS. 1A-1C, the accessory 310 of the smart device 300 is a hand grip. Of course, the dimensions of the receptacle 110 and width of the channel 114 can be adjusted during manufacture to accommodate other smart device 300 and related accessories without departing from the spirit and scope of the subject matter described herein.

With further respect to the receptacle 110, the receptacle 110 is of unitary construction, such that the planar surface 112 and sidewall 116 define a single component. For prolonged use by a variety of users in a commercial retail setting, the receptacle 110 also has a fixed dimension and is devoid of any articulating or sliding components. Moreover, for reduced cost and improved weather resistance, the receptacle 110 is preferably constructed of a plastic material. It should be appreciated, however, that various other durable materials, such as metal, wood, and the like, may be also used to construct the receptacle while still enabling the receptacle 110 to function for its intended purpose. Likewise, it is also contemplated that the planar surface and sidewall of an exemplary holder can be two separate components that can be joined together.

Figure 2:
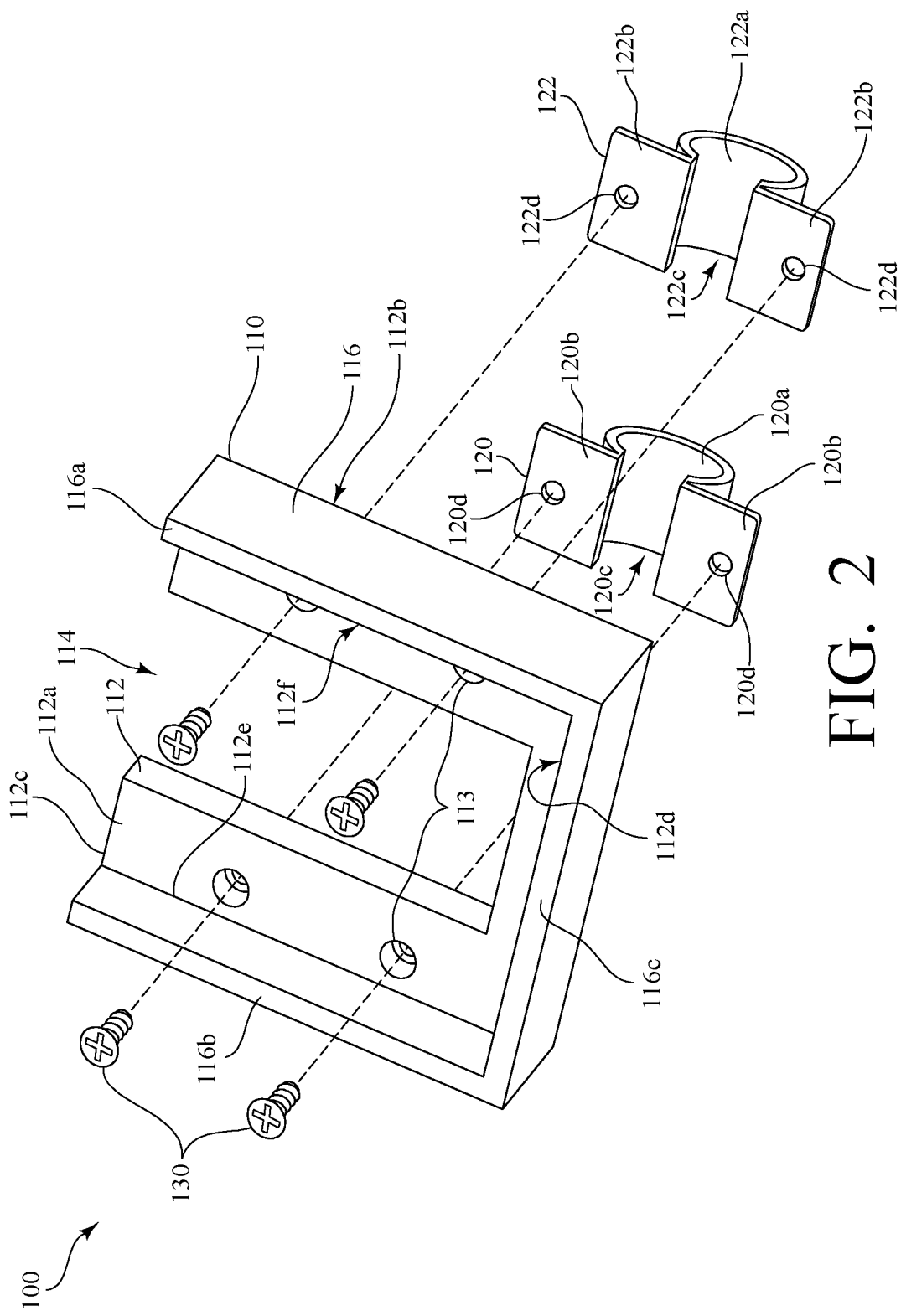
FIG. 2 is an exploded view of the exemplary holder of FIG. 1A.

Referring now more particularly to FIG. 2, each fastener 120, 122 generally includes a central portion 120*a*, 122*a* for receiving the handle 210 of the shopping cart 200 therein and two opposing flanges 120*b*, 122*b* configured for connection to the back face 112*b* of the planar surface 112. The opposing flanges 120*b*, 122*b* of each fastener 120, 122 define an open end 120*c*, 122*c* through which the handle 210 of the shopping cart 200 may pass into the central portion 120*a*, 122*a*. The central portion 120*a*, 122*a* of each fastener 120, 122 is shaped to correspond to an arc of the circumference of the shopping cart 200 handle 210, such that the central portion 120*a*, 122*a* of each fastener 120, 122 wraps around an area of the exterior surface of the handle 210. In this exemplary embodiment, the central portion 120*a*, 122*a* of each fastener 120, 122 is annularly shaped to accommodate a cylindrical handle. Of course, the central portion of each fastener can, in other embodiments, also be alternatively shaped to correspond to non-annular handle designs without departing from the spirit and scope of the subject matter described herein.

Referring now more generally again to FIGS. 1A-1C and FIG. 2, to provide a close-fitting connection between each fastener 120, 122 and the handle 210 of the shopping cart 200 received therein, the open end 120*c*, 122*c* of each fastener 120, 122 is of a smaller width than the diameter of the handle 210. Thus, to permit entry of the handle 210 through the entryway 120*c*, 122*c*, each fastener 120, 122, is at least semi-flexible, such that the distance between the opposing flanges 120*b*, 122*b*, of each fastener 120, 122 can be temporarily increased (e.g., by pulling the opposing flanges 120*b*, 122*b* apart or pushing the central portion 120*a*, 122*a* of each fastener 120, 122 towards the handle 210) to provide a wider open end 120*c*, 120*d* and permit entry of the handle 210 into the central portion 120*a*, 122*a*. Preferably, each fastener 120, 122 is biased, such that a biasing force must be overcome to increase the distance between the opposing flanges 120*b*, 122*b* of each fastener 120, 122. Once the handle 210 is received in the central portion 120*a*, 122*a* and the biasing force is no longer overcome, a restoring force draws the opposing flanges 120*b*, 122*b* back towards one another to decrease the width of the open end 120*c*, 122*c*. In this exemplary embodiment, each fastener 120, 122 is constructed of a semi-rigid plastic material, though it should be appreciated that alternative materials may also be used to construct the fasteners 120, 122.

When the handle 210 is received in the central portion 120*a*, 122*a*, the opposing flanges 120*b*, 122*b* of each fastener 120, 122 extend in a direction perpendicular to the direction in which the handle 210 extends to provide two opposing surfaces located proximate to the handle 210 to which the receptacle 110 can be connected. When the handle 210 of the shopping cart 200 is received within the central portion 120*a*, 122*a* and the receptacle 110 is connected to the opposing flanges 120*b*, 122*b* of each fastener 120, 122 (i.e., the holder 100 is assembled around the handle 210), the open end 120*c*, 122*c* of each fastener 120, 122 is covered by the back face 112*b* of the receptacle 110. As such, the back face 112*b* of the planar surface 112 and fasteners 120, 122 fully encompass the shopping cart handle 210 in the areas of the handle 210 where the fasteners 120, 122 are located. Thus, unlike clip-based smart device holders that maintain an opening within the fastener to facilitate simple installation and removal, the holder 100 of the present invention, once installed, cannot be removed from the handle 210 of the shopping cart 200 without first disconnecting the fasteners 120, 122 from the receptacle 110. As such, the holder 100 is generally a semi-permanent device on the shopping cart 200 that cannot be easily removed by customers of a retail store.

Referring again to FIG. 2, the receptacle 110 is connected to the fasteners 120, 122 using a plurality of screws 130, which hold the opposing flanges 120*b*, 122*b* of each fastener 120, 122 to the back face 112*b* of the planar surface 112. In this regard, to deter unauthorized individuals from easily removing the holder 100 from the shopping cart 200, the holder 100 requires the use of a tool to engage the screws 130 and connect and disconnect the receptacle 110 from the fasteners 120, 122, thereby enabling the holder 100 to remain as an enduring fixture on the shopping cart 200. Of course, any number of other suitable means configured to removably connect the receptacle 110 to the fasteners 120, 122 can also be used without departing from the inventive subject matter disclosed herein. For example, in some embodiments, an exemplary receptacle and fastener can be connected to one another using bolts and corresponding nuts, screws and corresponding nuts, or combinations thereof. As another example, it is contemplated that a receptacle can be permanently connected to the fasteners using adhesives and the like in order to prevent the respective components of the holder from being disassociated from one another once a holder is installed on the shopping cart.

To facilitate passage of the plurality of screws 130 through the receptacle 110 for engagement with the fasteners 120, 122, the receptacle 110 includes a plurality of bores 113, which extend from the front face 112*a* of the planar surface 112 to the back face 112*b* of the planar surface 112. The opposing flanges 120*b*, 122*b* of each fastener 120, 122 also include openings 120d, 122d therein, which receive the screws 130 extending through the receptacle 110. In this exemplary embodiment, two screws 130 are used for each fastener 120, 122. As such, each fastener 120, 122 includes two openings 120d, 122d, that correspond to two bores 113 within the receptacle 110. As further shown in FIG. 2, the bores 113 in the planar surface 112 are positioned such that the first fastener 120 and the second fastener 122 are disposed on opposite sides of the channel 114 when the holder 100 is assembled.

Referring now to FIG. 1A and FIG. 2, the shopping cart 200 is a cart consistent with that commonly found within grocery stores or other retail settings for transporting items while shopping and, to this end, includes a basket portion 215, a plurality of wheels 220, and a handle 210 for pushing the shopping cart 200. It is understood, however, that the shopping cart 200 illustrated in FIG. 1 is but one type of cart on which the holder 100 of the present invention may be installed on to provide a system 10 for holding a smart device. Indeed, the holder 100 of the present invention can be combined with other cart designs or types and find utility. For example, the holder 100 may be installed on the handle of a stroller in the same manner as described herein with reference to the shopping cart 200 and associated handle 210.

To install the holder 100 on the shopping cart 200, the handle 210 of the shopping cart 200 is first inserted into the central portion 120a, 122a of the fasteners 120, 122. The bores 113 of the receptacle 110 are then aligned with the corresponding openings 120d, 122d within the opposing flanges 120b, 122b of each fastener 120, 122 to establish a passageway for the plurality of screws 130 to pass. To effectively hold a smart device 300, the receptacle 110 and fasteners 120, 122 are positioned relative to the handle 210, such that, when the receptacle 110 is connected to the fasteners 120, 122, the open top end 110a of the receptacle 110 is pointed in a skyward direction or towards the front of the shopping cart 200 and the back face 112b of the planar surface 112 is in contact with the opposing flanges 120b, 122b of the fasteners 120, 122. The plurality of securing members 130 are subsequently introduced into the pathway defined by the bores 113 and openings 120d, 122d and manipulated as to hold the opposing flanges 120b, 122b of the fasteners 120, 122 to the back face 112b of the planar surface 112 and maintain the holder 100 in an assembled configuration around the handle 210 of the shopping cart 200. Once the holder 100 is installed, the system 10 is ready for use and a user can deposit their smart device 300 into the holder 100 with its front face 300e pointed towards the open front face 110b of the receptacle 110, thereby enabling the user to view content displayed on the smart device 300 while shopping. Smart devices which may be utilized with holder 100 include, but are not limited to, smartphones and tablets.

Figure 3A:
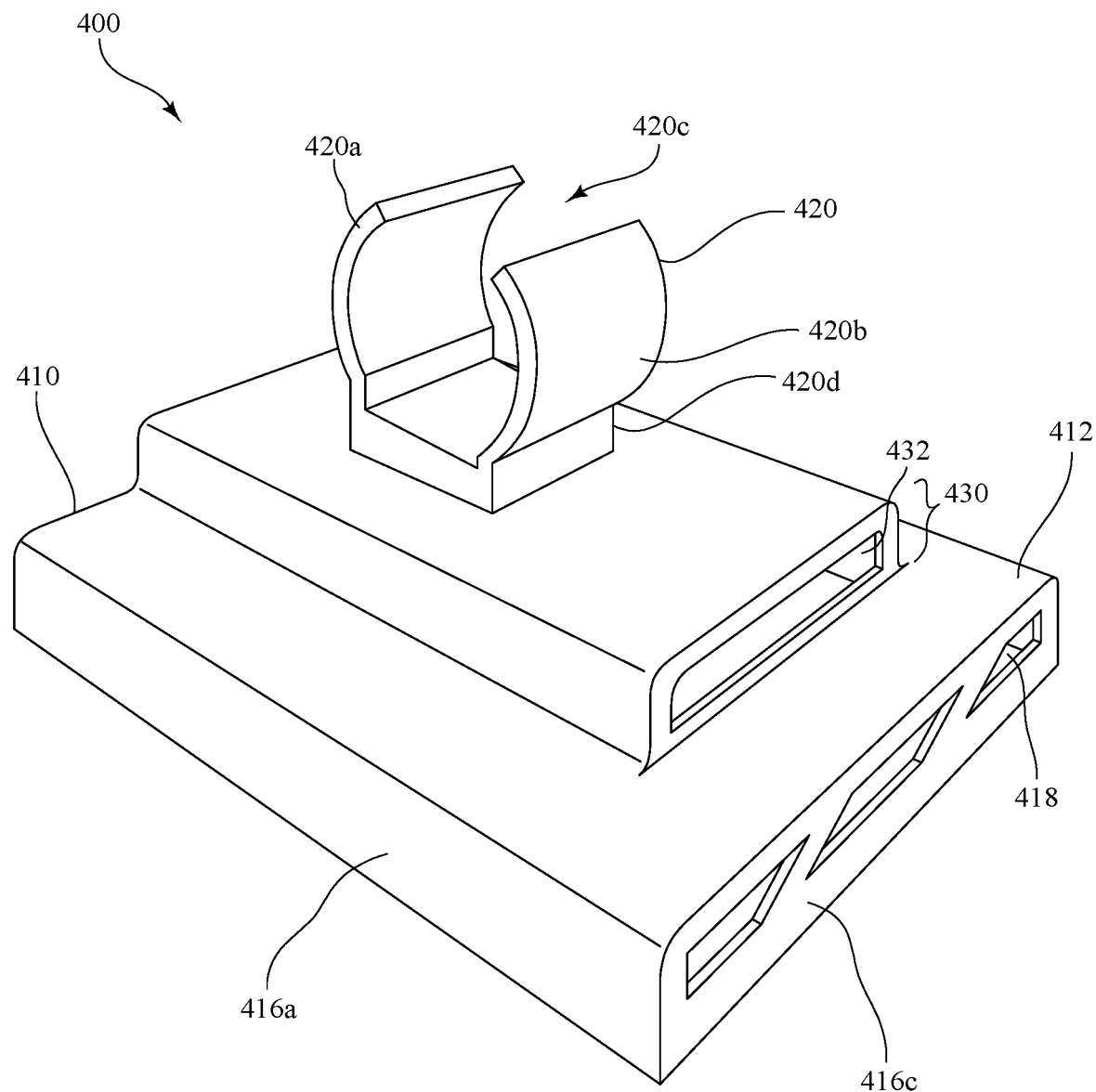
FIG. 3A is a rear perspective view of another exemplary holder made in accordance with the present invention.
Figure 3B:
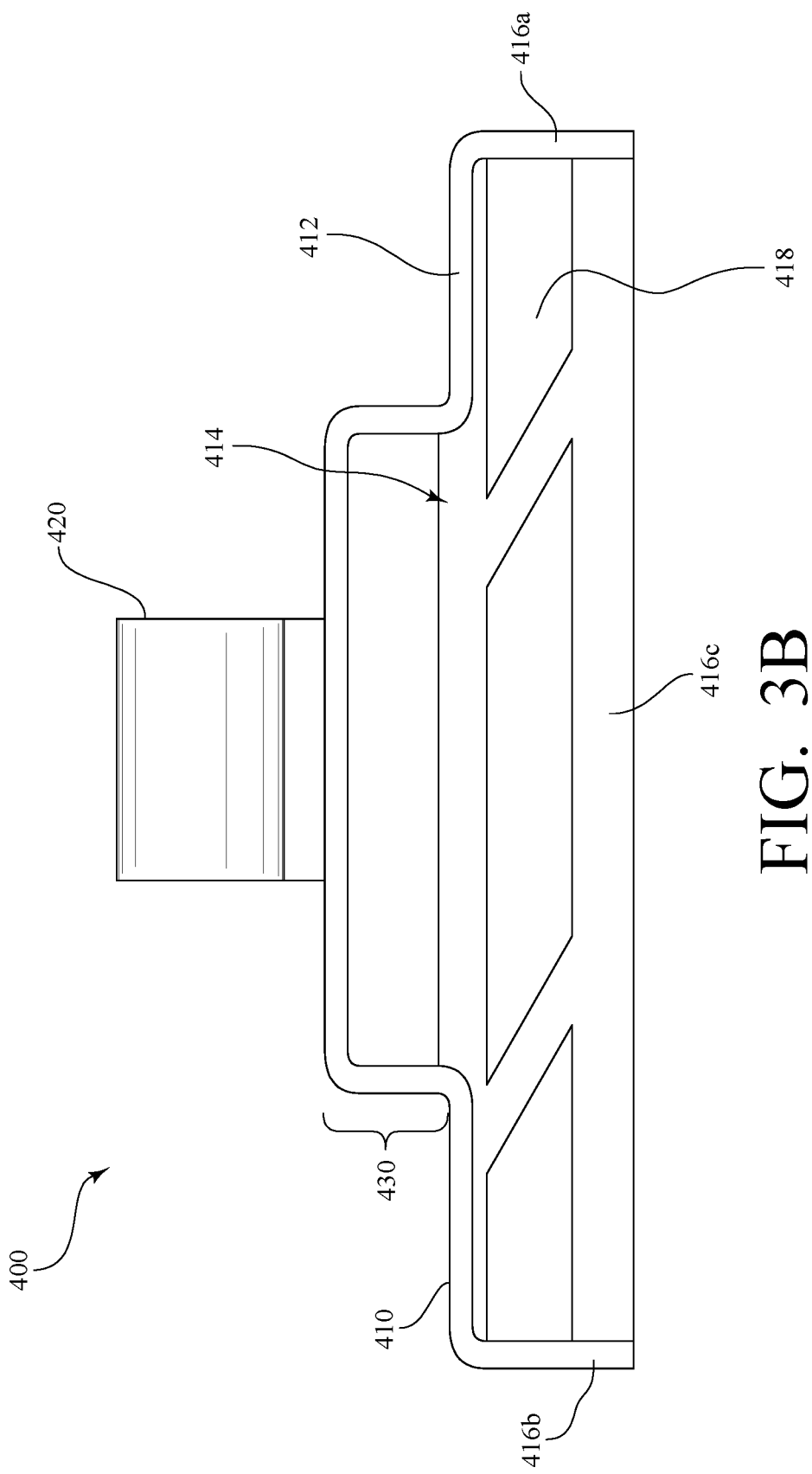
FIG. 3B is a top view of the holder of FIG. 3A.

Referring now to FIGS. 3A and 3B, FIGS. 3A and 3B show a rear perspective view and a top view, respectively, of another smart device holder 400 made in accordance with the present invention. Like the holder 100 described above with reference to FIGS. 1A-1C and FIG. 2, the holder 400 also includes a receptacle 410 for receiving a user's smart device and at least one fastener 420 for securing the holder 400 to the handle 210 of the shopping cart 200. In this particular embodiment, however, the holder 400 includes only a single fastener 420. Moreover, while the receptacle 410 includes similar structural features (i.e., a planar surface 412 that defines a channel 414, a first sidewall portion 416a, a second sidewall portion 416b, and a third sidewall portion 416c) and provides the same functionality as the holder 100 described above with reference to FIGS. 1A-1C and FIG. 2, the third sidewall portion 416c defining the shelf on which a smart device 300 rests includes one or more slots 418 and the channel 414 defined by the planar surface 412 is partially enclosed by a recessed portion 430. In particular, the third sidewall portion 416c includes three slots 418 which permit water to drain from the bottom portion of the receptacle 410 and thus make the holder 400 better adapted for use in inclement weather conditions. Of course it is contemplated that fewer than three slots or more than three slots may also be present in the third sidewall portion 416c to provide such draining functionality. Further, in alternative embodiments, it is also contemplated that slots can be provided in other sidewalls of an exemplary holder and/or that more than one fastener can be utilized to further secure the receptacle to the handle of a shopping cart.

With respect to the recessed portion 430 included in the holder 400, the recessed portion 430 extends outwardly from the back face of the planar surface 412 and across the channel 414, such that the channel 414 is partially enclosed by the recessed portion 430. As perhaps best shown in FIG. 3B, the recessed portion 430 extends outwardly from the planar surface 412 a distance that is sufficient to permit an accessory of a smart device to pass through the channel 414 and allow the smart device to rest flush against planar surface 412 within the receptacle 410. The recessed portion 430 is also integrally formed with the planar surface 412 so as to permanently secure it to the planar surface 412. However, in alternative embodiments, the recessed portion can also be a separate component from the planar surface and can be either permanently or removably secured to the planar surface. The recessed portion alone or the recessed portion in combination with the planar surface can, in further embodiments, also define an additional slot within the receptacle that facilitates drainage and further serves to prevent water buildup within the receptacle. Additionally, as the recessed portion 430 extends across the channel 414, the recessed portion 430 provides an additional surface on which the fastener 420 is positioned or secured.

In exemplary embodiment shown in FIGS. 3A and 3B, and unlike the holder 100 shown in FIGS. 1A-1C and FIG. 2, the fastener 420 is a clip-style fastener that is configured to clip to the handle 210 of a shopping cart 200 to facilitate easy installation and removal of the holder 400 to the handle 210 of the shopping cart 200 without the use of tools. As such, in this embodiment, the fastener 420 includes two opposing arms 420a, 420b that extend outwardly from a base 420d, which is positioned on or secured to a back face of the recessed portion 430. Each arm 420a, 420b of the fastener 420 is shaped to correspond to an arc of the circumference of a handle 210 of a shopping cart 200. The opposing arms 420a, 420b of the fastener 420 are spaced apart to provide an open end 420c opposite of the base 420d through which the handle 210 of the shopping cart 200 passes. As the base 420d is disposed opposite of the open end 420c and is the aspect of the fastener 420 secured to the receptacle 410, the open end 420c is not obstructed by the receptacle 410 during use, thereby enabling the handle 210 of a shopping cart 200 to pass into or out of the open end 420c to secure the holder 400 to or to remove the holder 400 from the handle 210 of a shopping cart 200, respectively, without the use of tools.

The fastener 420 is generally integrally formed with the recessed portion 430 and is secured to the back face of the recessed portion 430, such that the fastener 420 is positioned opposite of the channel 414. The fastener 420 is also angled relative to the back face of the recessed portion 430 to secure the receptacle 410 in angled relation to the handle 210 of the shopping cart 200. In particular, in this exemplary embodiment, the fastener 420 is angled approximately 30 degrees relative to the back surface of the recessed portion 430, as shown best in FIG. 3A, and the height of the base 420d of the fastener 420 increases as the base 420d extends from one end to the other. Of course, depending on the particular application or shopping cart, the fastener may be angled through alternative means and/or exhibit different angles relative to the back face of the recessed portion while still enabling the holder to function for its intended purpose.

With further respect to the fastener 420, the fastener 420 is biased, such that a biasing force must be overcome to increase the distance between the opposing arms 420a, 420b of the fastener 420. Once the handle 210 is passed through the open end 420c in the fastener 420 and the biasing force is no longer overcome, a restoring force draws the opposing arms 420a, 420b back towards one another to decrease the width of the open end 420c within the fastener 420, thereby holding the holder 400 in secure relation to a handle of a shopping cart. In this exemplary embodiment, the fastener 420 is thus constructed of a semi-rigid plastic material, though it should be appreciated that alternative materials can also be used to construct the fastener 420.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

What is claimed is:

1. A holder for mounting to a shopping cart and supporting a smart device, comprising:
   a receptacle for receiving the smart device, the receptacle including
      a planar surface having a front face and a back face, the planar surface defining a channel configured to permit an accessory of the smart device to pass through the planar surface, the channel extending from a top portion of the planar surface to a closed bottom portion of the planar surface, and the channel extending more than half of a length of the planar surface,
      a sidewall extending perpendicularly away from the front face of the planar surface along each side and along the bottom portion of the planar surface, and
      a recessed portion extending from the back face of the planar surface across the channel; and
   at least one fastener for securing the receptacle to the shopping cart, the at least one fastener disposed on a back face of the recessed portion and opposite of the channel.

2. The device of claim 1, wherein the top portion of the planar surface is open.

3. The device of claim 2, wherein the at least one fastener comprises a single fastener.

4. The device of claim 1, wherein the receptacle has fixed dimensions.

5. The device of claim 1, wherein the sidewall extending perpendicularly away from and along each side of the planar surface includes a first sidewall and a second sidewall opposite the first sidewall, and wherein a distance between the first sidewall and the second sidewall is less than a length of the smart device.

6. A holder for mounting to a shopping cart and supporting a smart device, comprising:
   a receptacle for receiving the smart device, the receptacle having a length less than a length of the smart device and a width less than the length of the smart device, and the receptacle including
      a planar surface having a front face and a back face, the planar surface defining a channel configured to permit an accessory of the smart device to pass through the planar surface, the channel extending from a top portion of the planar surface toward a closed bottom portion of the planar surface, and
      a sidewall extending perpendicularly away from the front face of the planar surface along each side and along a bottom of the planar surface;
   a first fastener for securing the receptacle to a handle of the shopping cart; and
   a second fastener for securing the receptacle to the handle of the shopping cart,
   wherein the first fastener and the second fastener are connected to the back face of the planar surface and are disposed on opposite sides of the channel.

7. The device of claim 6, wherein the first fastener and the second fastener are shaped and configured to extend at least partially around a circumference of the handle of the shopping cart.

8. The device of claim 7, wherein each fastener of the first fastener and the second fastener has an open end for positioning the fastener around the handle, and wherein, upon positioning the fastener around the handle and connecting the fastener to the receptacle, the open end of the fastener is covered by the receptacle.

9. The device of claim 7, wherein the first fastener and the second fastener are removably connected to the receptacle.

10. The device of the claim 6, wherein the receptacle has fixed dimensions.

11. The device of claim 1, wherein the at least one fastener is a clip-style fastener.

12. The device of claim 11, wherein a portion of the sidewall extending along the bottom of the planar surface includes a slot for allowing liquid to drain from the receptacle.

13. A system for holding a smart device, comprising:
   a shopping cart including a handle; and
   a holder for mounting to the handle of the shopping cart and supporting the smart device, the holder including,
      a receptacle for receiving the smart device, the receptacle including
         a planar surface having a front face and a back face, and the planar surface defining a channel configured to permit an accessory of the smart device to pass through the planar surface, the channel extending from a top portion of the planar surface to a closed bottom portion of the planar surface, and the channel extending more than half of a length of the planar surface, and
         a sidewall extending perpendicularly away from the front face of the planar surface along each side and along the bottom portion of the planar surface, and
      at least one fastener for securing the holder to the handle;
   wherein the at least one fastener includes one of (i) a fastener disposed on a back face of a recessed portion, the recessed portion extending from the back face of the planar surface, across the channel and opposite of the channel and (ii) two fasteners that are connected to the back face of the planar surface and disposed on opposite sides of the channel.

14. The system of claim 13, wherein the at least one fastener extends around the handle.

15. The system of claim 13, wherein the receptacle has a length less than a length of the smart device.

16. The system of claim 15, wherein the receptacle has a width less than the length of the smart device.

17. The system of claim 13, wherein the sidewall extending along the bottom portion of the planar surface includes a slot for allowing liquid to drain from the receptacle.

18. The system of claim 13, wherein the receptacle further includes a recessed portion extending from the back face of the planar surface across the channel, and wherein the at least one fastener is connected to the recessed portion.

* * * * *